United States Patent [19]

Smith

[11] 4,251,476
[45] Feb. 17, 1981

[54] MANUFACTURE OF ORNAMENTAL VEHICLE WHEELS

[75] Inventor: Richard W. Smith, Lansing, Mich.

[73] Assignee: Motor Wheel Corporation, Lansing, Mich.

[21] Appl. No.: 21,160

[22] Filed: Mar. 16, 1979

[51] Int. Cl.³ ............................................. B29D 27/04
[52] U.S. Cl. ................................... 264/46.7; 264/46.6;
264/46.9; 264/271; 264/259; 264/DIG. 83;
301/37 R
[58] Field of Search .................... 264/46.7, 46.6, 46.5,
264/46.4, DIG. 83, 46.9, 259, 271; 301/37 R

[56] References Cited

U.S. PATENT DOCUMENTS

| | | |
|---|---|---|
| 490,459 | 1/1893 | Straus . |
| 2,264,003 | 11/1941 | Osenberg . |
| 2,394,327 | 2/1946 | Niessen et al. ...................... 264/46.6 |
| 2,753,642 | 7/1956 | Sullivan ........................... 264/46.6 X |
| 3,122,598 | 2/1964 | Berger . |
| 3,331,175 | 7/1967 | Terrio . |
| 3,401,143 | 9/1968 | Finelli et al. . |
| 3,487,134 | 12/1969 | Burr ..................................... 264/46.6 |
| 3,493,257 | 2/1970 | Fitzgerald et al. . |
| 3,504,063 | 3/1970 | Lemelson . |
| 3,660,211 | 5/1972 | Brody . |
| 3,669,501 | 6/1972 | Derleth ........................... 264/46.5 X |
| 3,699,063 | 10/1972 | Scheibelhoffer . |
| 3,734,894 | 5/1973 | Finelli et al. . |
| 3,795,722 | 3/1974 | Sassaman ............................ 264/46.4 |
| 3,845,183 | 10/1974 | Harrison ......................... 264/46.7 X |
| 3,956,451 | 5/1976 | Adams ............................ 264/46.9 X |

FOREIGN PATENT DOCUMENTS

| | | |
|---|---|---|
| 2405666 | 8/1975 | Fed. Rep. of Germany . |
| 2544664 | 4/1977 | Fed. Rep. of Germany . |
| 2083634 | 12/1971 | France . |
| 1372357 | 10/1974 | United Kingdom ................... 264/45.5 |
| 1456983 | 12/1976 | United Kingdom ................... 264/46.8 |

Primary Examiner—Philip Anderson
Attorney, Agent, or Firm—Barnes, Kisselle, Raisch & Choate

[57] ABSTRACT

Manufacture of ornamental vehicle wheels wherein a mold surface of desired decorative contour is sprayed with one or more layers of a polyurethane reaction mixture and partially cured in situ. A steel wheel is then placed over the mold surface and a polyurethane reaction mixture which includes a foaming agent is poured into the mold cavity formed therebetween. The poured mixture is then cured and the layers are finish-cured in situ to form an integral ornamental elastomeric structure adhered to the wheel.

10 Claims, 5 Drawing Figures

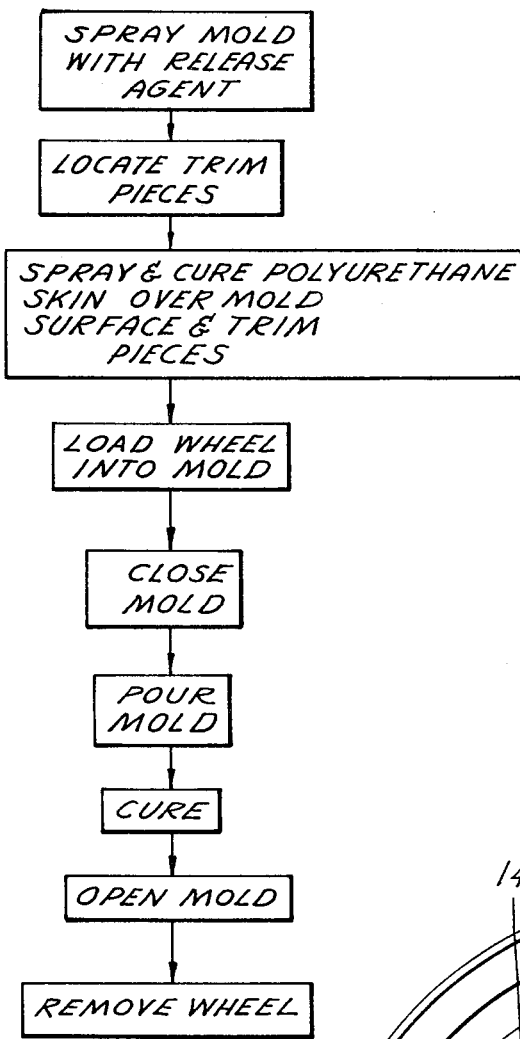
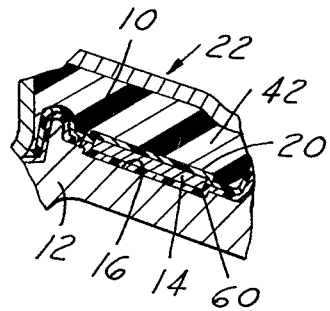
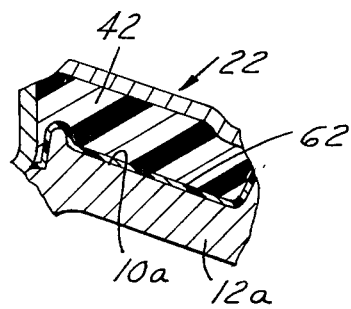
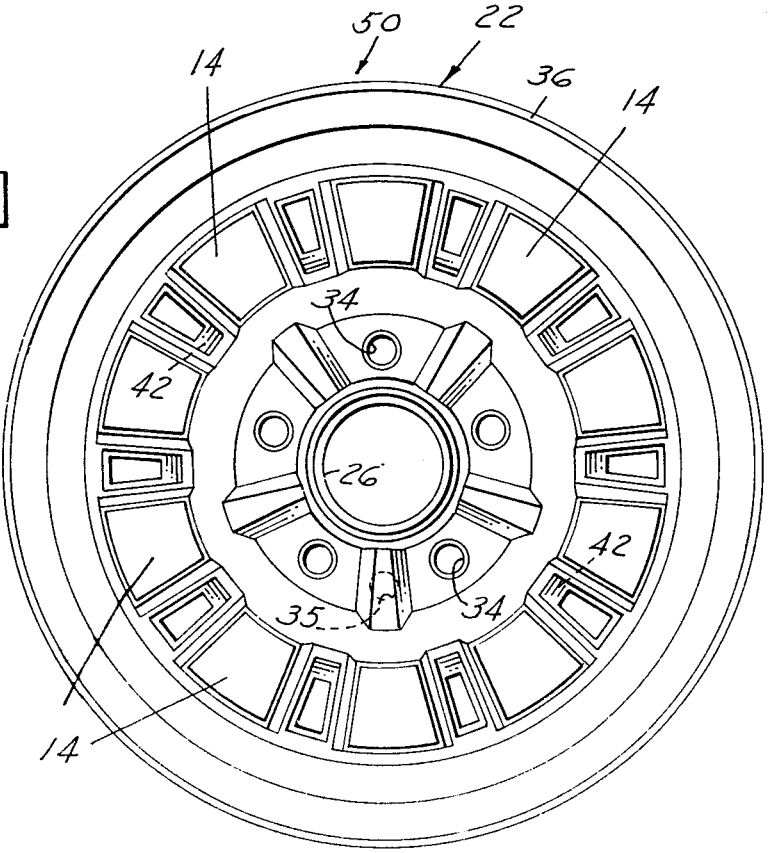

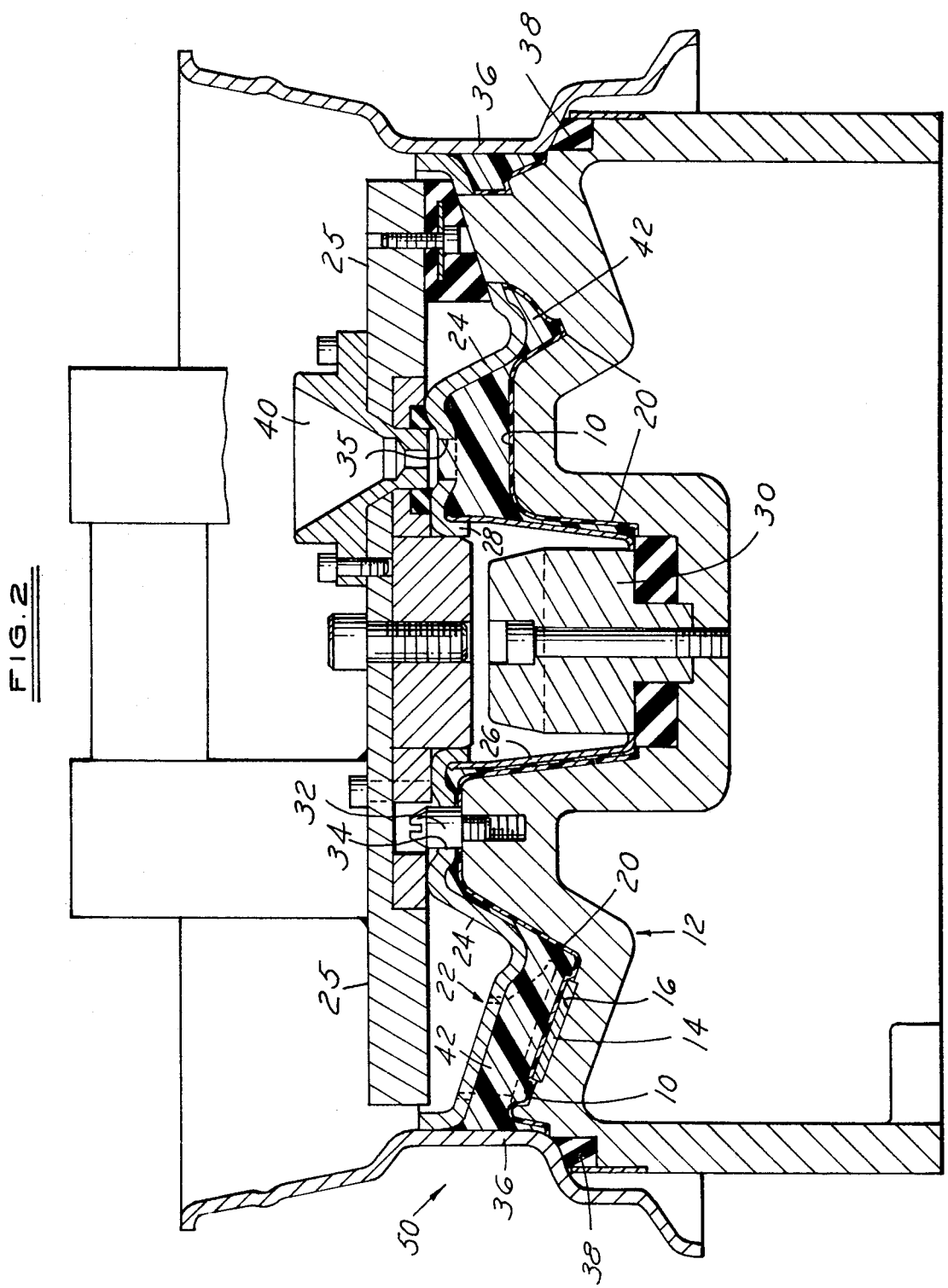

MANUFACTURE OF ORNAMENTAL VEHICLE WHEELS

The present invention relates to methods for manufacturing ornamental vehicle wheels and to the resulting products. More particularly, the present invention relates to improvements in the wheels and methods of manufacture disclosed in Adams U.S. Pat. No. 3,956,451 and Derleth U.S. Pat. No. 3,669,501, both assigned to the assignee hereof.

By way of background, the above-referenced Adams U.S. Pat. No. 3,956,451 discloses, inter alia, location of a prefabricated conventional steel wheel over a female mold, and then pouring a reactive polyurethane mixture into the cavity between the wheel and mold which, upon curing, is adhered to the outboard face of the wheel. The composite product comprises a steel wheel with a styled ornamental urethane exterior trim body. The urethane trim body or section commercially manufactured to date has been relatively dense (40 to 55 lbs. per cubic foot) and of noncellular or closed microcellular construction to resist moisture absorption. The mold surface may be nickel plated and polished to lend a high-gloss metallic appearance to the ornamental overlay. If pigmentation is desired, the overlay of the composite product may be spray painted. As a modification, the Adams patent also discloses that metal trim pieces may be located on the mold surface and held in place by magnets buried in the mold, such that the trim pieces become buried in and adhered to the exterior surface of the molded urethane body.

The Derleth U.S. Pat. No. 3,669,501 discloses an ornamental composite wheel construction comprising in one embodiment thereof a conventional steel wheel, a separately formed ornamental cover of impact resistant plastic, and an adhesive filler of low density polyurethane in the cavity between the wheel and cover.

Objects of the present invention are to provide a vehicle wheel and a method of manufacture which are less expensive than are those disclosed in the prior art, including the referenced Adams and Derleth patents.

In furtherance of the above, a more specific object of the invention is to provide a wheel which includes a permanently affixed ornamental overlay comprising a tough, resilient and lightweight skin covering a very low-density urethane underbody, and which therefore is lighter than is the Adams wheel yet retains the desirable qualities of safety, water resistance, resiliency and durability. A further object of the invention is to provide a method of manufacturing such a wheel.

Yet another object of the invention is to provide an improved wheel manufacturing method which reduces or, preferably, eliminates the problems of skewing and flashing around the decorative trim pieces in the Adams wheels.

The invention, together with additional objects, features and advantages thereof, will be best understood from the following description, the appended claims and the accompanying drawings in which:

FIG. 1 is a flow diagram of one presently preferred process for manufacturing ornamental vehicle wheels in accordance with the invention;

FIG. 2 is an elevational view in radial bisection of a wheel in accordance with the invention in a mold for forming the same in accordance with the steps of FIG. 1;

FIG. 3 is a front elevational view of the finished wheel; and

FIGS. 4 and 5 are fragmentary sectional views similar to a portion of FIG. 2 showing respective alternative embodiments of the invention.

In accordance with the method of the invention, a conventional mold release agent is sprayed or otherwise applied as a thin film in sufficient quantity to cover completely the contoured upper surface 10 of a preheated female mold 12 (temperature ranging from about 100° F. to 200° F. A number of flat metallic decals or trim pieces 14 of desired outline are then placed in a predetermined array on the mold surface 10 by suitable modes of locating, such as by using a mask or template, by magnets, or by pre-defined raised or recessed areas on the mold surface. By way of example and not by way of limitation, as shown in FIG. 2, corresponding pockets 16 may be provided in circular array around mold surface 10. Pockets 16 are preferably only slightly larger than trim pieces 14, such that the trim pieces are loosely received therein but are held by the pocket walls against substantial misorientation. A suitable temporary (i.e. subsequentially removable as by wash off, peel off, etc.) adhesive coating may be provided on the outboard face of each decal to operate as an effective temporary adhesive to hold the trim pieces in place. The particular example of mold 12 as shown in FIG. 2 is substantially identical to those disclosed in the referenced Adams patent, with the exception of pockets 16 which replace an array of magnets in the Adams mold, and need not be discussed in further detail herein. A clear or pigmented film 20 of a non-viscous polyurethane reaction mixture is then sprayed or otherwise applied over preheated mold surface 10 and trim pieces 14. Preferred reaction mixtures are disclosed in U.S. Pat. Nos. 3,401,143 and 3,734,894, and are marketed by The Goodyear Tire & Rubber Company, the assignee of said patents and parent company to the assignee herein, under the trademark NEOTHANE. Other materials suitable for spray application of film 20 are acrylic or acrylic-modified urethane. Preferably, the polyurethane reaction mixture is sprayed onto the mold surface in a film in the range of 0.005 to 0.025 inches thick between room temperature and 100° F. After about a three minute "flash" to allow solvent evaporation, the film is partially cured in situ in a baking operation (such as five to seven minutes at 100° F. to 120° F.) and holds trim pieces 14 firmly in place on mold surface 10.

A prefabricated steel wheel 22 of generally conventional contour is then placed over mold 12. The wheel 22 illustrated in FIGS. 2 and 3 includes a generally cylindrical metallic cup or shell 26 affixed to the disc flange 28 for covering an axle hub. The hub shell 26 and disc 24 are centered on mold 12 by a central boss 30 received within shell 26, and by the studs 32 received in each of the disc bolt holes 34. Alternatively, shell 26 may be omitted and mold 12 revised so as to define in conjunction with wheel 22 the entire wall surface of the molding cavity. The wheel rim 36 rests upon an annular resilient seal 38 carried by mold 12, and the wheel is clamped firmly in place over mold surface 10 by closure of the top plate 24. A second polyurethane reaction mixture including a suitable blowing agent is then poured by gravity or injected under pressure through the funneled orifice 40 carried by plate 25, and through a sprue opening 35 aligned therewith in disc 24 into the cavity defined by wheel 22 and opposing mold 12. The mold is then raised to an elevated temperature at which curing of skin layer 20 is completed to form a tough resilient high-density protective skin resistant to water, salt, petroleum products, urine and other adverse elements to which wheels are exposed in normal use. Skin 20 preferably has a density in the range of thirty to seventy-five lbs. per cubic foot, and most preferably sixty-five to seventy-five lbs. per cubic foot. The foamed polyurethane mixture also cures at this elevated temperature to form a solid elastomeric underbody or core 42 having a density in the preferred range of 5 to 10 lbs. per cubic foot. Underbody 42 is firmly adhered to wheel 22 and is structurally cross-linked to skin 20 during the final curing operation to form an integral composite styled overlay permanently affixed to disc 22 and rim 36 thus to provide an ornamental wheel assembly 50 (FIG. 3) when the mold is opened and the wheel removed. It is to be understood that, alternatively, the composite overlay 20,42 may be molded to, and cover only, part or all of the outboard surface of disc 22 or rim 36.

The method for manufacture of ornamental wheels thus far described possesses significant advantages as compared with that disclosed in the above-referenced Adams patent: (1) the sprayed polyurethane layer 20 forms a rugged but resilient water-tight external skin for the decorative plastic overlay of the composite wheel, which permits the use of low density and relatively non-rigid polyurethane between the exterior skin and the steel wheel disc and rim; (2) the partially cured skin layer holds the trim pieces 14 firmly in place, such that the trim pieces will not be mislocated during pouring or injection of the polyurethane reaction mixture; (3) the skin layer 20 between the trim pieces 14 and the interior urethane body 42 serves as a seal around the pieces, and thus eliminates any requirement for trimming of urethane flash around the piece edges in the final product; and (4) the skin layer may be pigmented as desired, which eliminates a painting step where colored styling is desired. It is also to be noted that the method herein disclosed differs from that of the particular embodiment described in the above-referenced Derleth patent in that the skin layer and ornamental body are formed in sequential steps of a single molding operation, thereby eliminating the requirement for manufacture and storage of a separate disc cover as in Derleth.

The second process in accordance with the invention and illustrated in FIG. 4 contemplates spraying or otherwise applying a thin (0.010 to 0.025 inches thick) translucent layer 60 of polyurethane to the preheated mold surface 10 after spraying of the mold release agent thereon but before placement of trim pieces 14, i.e. between the first and second process steps illustrated in FIG. 1. The outer translucent layer 60 enhances temporary adhesion of trim pieces 14 to the mold surface during pouring or injection of the foaming mixture and, upon curing, forms a second resilient skin layer. Another modified process in accordance with the invention and illustrated in FIG. 5 contemplates thermo- or vacuum-forming a skin layer 62 directly onto the surface 10a of a preheated mold 12a suitably apertured (not shown) for accomplishing the vacuum-forming operation. Skin layer 62 may be of ABS, polycarbonate, polyester, vinyl, polypropylene or polyphenylene. Skin layer 62 may be pigmented as desired, and may be between 0.010 and 0.100, and preferably on the order of 0.050 inches in average thickness. In a vacuum drawing operation, thickness will vary with contour. It will be appreciated, of course, that although trim pieces are not illustrated in FIG. 5, vacuum-formed layer 62 could be utilized both to hold such pieces in place as previously described and to form a protective skin. Similarly, the embodiments of FIGS. 1–4 are not limited to the broadest aspects of the invention to inclusion of trim pieces 14.

The invention claimed is:

1. A method of making an ornamental vehicle wheel which includes a metal disc wheel having a disc portion for mounting the wheel to a vehicle and a rim portion for carrying a vehicle tire, said method comprising the steps of (a) providing a mold having a mold surface contoured to provide a desired ornamental configuration and having a circumferential series of fixed trim placement areas on said mold surface, (b) placing ornamental trim pieces in said placement areas, (c) forming and at least partially curing in situ on said mold surface and over said trim pieces a skin of tough resilient elastomeric material, (d) placing a said metal disc wheel over said mold so as to define a cavity between said wheel and said mold surface, (e) molding and curing an elastomeric structure in said cavity to form an integral ornamental composite wheel assembly comprising said skin and said structure adhered to said wheel, and (f) removing said wheel from said mold with said elastomeric structure adhered thereto.

2. The method set forth in claim 1 wherein said step (c) comprises the step of spraying an elastomeric reaction mixture onto said mold surface so as to cover both said mold surface and said trim pieces.

3. The method set forth in claim 2 wherein said elastomeric reaction mixture is selected from the group consisting of polyurethane, acrylic and acrylic-modified urethane.

4. The method set forth in claim 1 wherein said step (c) comprises the step of thermoforming an elastomeric skin layer over said mold surface and said trim pieces.

5. The method set forth in claim 4 wherein said skin layer is of a construction selected from the group consisting of ABS, polycarbonate, polyester, vinyl, polypropylene and polyphenylene.

6. The method set forth in claim 2 or 1 wherein said step (c) comprises the steps of (c1) heating said mold face, (c2) forming said skin in situ on said heated mold face and (c3) only partially curing said skin in situ on said mold face; and wherein said step (e) comprises the steps of (e1) injecting a urethane reaction mixture including a blowing agent into said cavity and then (e2) simultaneously curing said urethane reaction mixture and said skin to cross-link said mixture and said skin to each other and thereby form said integral ornamental composite wheel assembly.

7. The method set forth in claim 6 wherein said skin has a density in the range of 30 to 75 lbs. per cubic foot and said elastomeric structure has a density in the range of 5 to 10 lbs. per cubic foot.

8. The method set forth in claim 7 wherein said skin has a thickness in the range of 0.010 to 0.025 inches.

9. The method set forth in claim 1 wherein said placement areas comprise pockets in said mold surface.

10. The method set forth in claim 9 or 1 comprising the additional step prior to said step (b) of (g) forming and at least partially curing in situ on said mold surface a second skin of high density, protective, translucent elastomeric material.

* * * * *